US012249307B2

(12) United States Patent
Graber

(10) Patent No.: US 12,249,307 B2
(45) Date of Patent: Mar. 11, 2025

(54) METHODS AND SYSTEMS OF SOUND-STIMULATION PRACTICE

(71) Applicant: Tony Jonathan Graber, Fulda, MN (US)

(72) Inventor: Tony Jonathan Graber, Fulda, MN (US)

( * ) Notice: Subject to any disclaimer, the term of this patent is extended or adjusted under 35 U.S.C. 154(b) by 731 days.

(21) Appl. No.: 17/233,538

(22) Filed: Apr. 18, 2021

(65) Prior Publication Data

US 2022/0335915 A1 Oct. 20, 2022

(51) Int. Cl.
*G10H 1/02* (2006.01)

(52) U.S. Cl.
CPC .................................... *G10H 1/02* (2013.01)

(58) Field of Classification Search
CPC ........................................................ G10H 1/02
USPC ............................................................ 84/600
See application file for complete search history.

(56) References Cited

U.S. PATENT DOCUMENTS 9,992,590 B2 * 6/2018 Baker .................... H04R 25/50
10,321,842 B2 * 6/2019 Garten .................. A61B 5/486
2008/0071136 A1 * 3/2008 Oohashi .................. G10H 7/00
600/27
2009/0051487 A1 * 2/2009 Sarig .................... G10H 1/0008
340/5.52
2014/0307878 A1 * 10/2014 Osborne .............. G10H 1/0008
381/56
2017/0143934 A1 * 5/2017 Tsai ........................ A61N 5/062
2018/0271710 A1 * 9/2018 Boesen ................ A61B 5/7203
2021/0169417 A1 * 6/2021 Burton ................. A61B 5/4857
2022/0335915 A1 * 10/2022 Graber ..................... G10H 1/02

FOREIGN PATENT DOCUMENTS

CA 2867661 A1 * 10/2013 ............ A61M 21/02
CA 3068213 A1 * 12/2017 ........... A61B 5/1116
CA 3080600 C * 11/2022 ............... A61B 3/16
CN 114783395 A * 7/2022
WO WO-2005084314 A2 * 9/2005 ........... A61B 5/0476
WO WO-2010120824 A2 * 10/2010 ............... A61N 1/20
WO WO-2015018755 A1 * 2/2015 ........... A61B 5/4836
WO WO-2019010004 A1 * 1/2019 ........... A61B 5/0205
WO WO-2021252292 A1 * 12/2021 ........... A61K 31/045

* cited by examiner

*Primary Examiner* — Christina M Schreiber

(57) ABSTRACT

In one aspect, a computerized method of auditory therapeutic stimulation with a mobile-device application includes the step of, with a mobile device, providing an auditory therapeutic stimulation application operative in the mobile device. The method includes the step of receiving a user input comprising a user pathology of the user or an athletic goal of the user. The method includes the step of associating the user input with a neurological region of user's brain; determine a tone frequency that stimulates the neurological region of user's brain. The method includes the step of determining a specified period to play the tone frequency. The method includes the step of playing the tone frequency to the user for the specified period of time.

20 Claims, 7 Drawing Sheets

| Tone | Frequency (Hz) | Note |
|---|---|---|
| C | 261.63 | Often called "middle C" |
| D | 293.66 | |
| E | 329.63 | |
| F | 349.23 | |
| G | 392.00 | |
| A | 440.00 | Used as a tuning reference |
| B | 493.88 | |

400

FIGURE 4

| | Stability Score | Normalized $V_{ave}$ [(mm/s)/m] | Normalized $VM_{ave}$ [(mm/s)*mm/m²] | Normalized SA [mm²/m²] |
|---|---|---|---|---|
| **Baseline (No Sound)** | 62.9 (12.7) | 48.6 (18.6) | 210.7 (140.3) | 4213.1 (2804.7) |
| **Music Only** | 65.0 (13.6) | 44.2 (16.8) | 191.3 (168.1) | 3689.7 (2741.3) |
| **Best Tone** | 75.8 (6.2) | 33.9 (11.0) | 98.7 (55.0) | 1974.6 (1099.7) |
| **Worst Tone** | 60.3 (14.0) | 44.1 (16.8) | 191.5 (137.6) | 3829.1 (2751.3) |

Table 3– $p$-values (observed power at $\alpha = 0.05$) for the repeated measures GLM analyses.

| | Stability Score | Normalized $V_{ave}$ | Normalized $VM_{ave}$ | Normalized SA |
|---|---|---|---|---|
| **Baseline – Music Only** | 0.255 (0.203) | 0.052 (0.497) | 0.435 (0.120) | 0.196 (0.250) |
| **Best Tone – Music Only** | **0.000 (1.000)** | **0.000 (1.000)** | **0.000 (1.000)** | **0.000 (1.000)** |
| **Best Tone – Baseline** | **0.000 (1.000)** | **0.000 (1.000)** | **0.000 (1.000)** | **0.000 (1.000)** |
| **Worst Tone – Music Only** | 0.013 (0.723) | 0.969 (0.050) | 0.994 (0.050) | 0.715 (0.065) |
| **Worst Tone – Baseline** | 0.138 (0.315) | 0.023 (0.634) | 0.271 (0.193) | 0.271 (0.193) |

500

FIGURE 5

METHODS AND SYSTEMS OF SOUND-STIMULATION PRACTICE

CLAIM OF PRIORITY

The present applications claims priority to and incorporates by reference in its entirety U.S. Provisional Patent Application No. 62/935,633, filed on 14 Nov. 2019, and titled METHODS AND SYSTEMS OF SOUND STIMULATION PRACTICE.

BACKGROUND

Audio therapy includes the clinical use of recorded sound, music, or spoken words, or a combination thereof, which patients can listen and receive a subsequent beneficial physiological, psychological, or social effect. As a subset of audio therapy, pure tones can be played as a form brain stimulation therapy. However, it is difficult for users to match therapeutic or athletic goals with the appropriate tones. Additionally, users may wish to integrate therapeutic tones into music they listen to while exercising, meditating, etc. According, improvement to tone therapy are desired to enable users to easily find an appropriate therapeutic tone and integrate said tone into local digital file on the user's mobile device.

SUMMARY OF THE INVENTION

In one aspect, a computerized method of auditory therapeutic stimulation with a mobile-device application includes the step of, with a mobile device, providing an auditory therapeutic stimulation application operative in the mobile device. The method includes the step of receiving a user input comprising a user pathology of the user or an athletic goal of the user. The method includes the step of associating the user input with a neurological region of user's brain; determine a tone frequency that stimulates the neurological region of user's brain. The method includes the step of determining a specified period to play the tone frequency. The method includes the step of playing the tone frequency to the user for the specified period of time.

BRIEF DESCRIPTION OF THE DRAWINGS

FIG. 4 illustrates an example table of tones that can be used to implement tone practice, according to some embodiments.

FIG. 5 illustrates another example set of table of tone information that can be used to implement tone practice, according to some embodiments.

Figure 1:
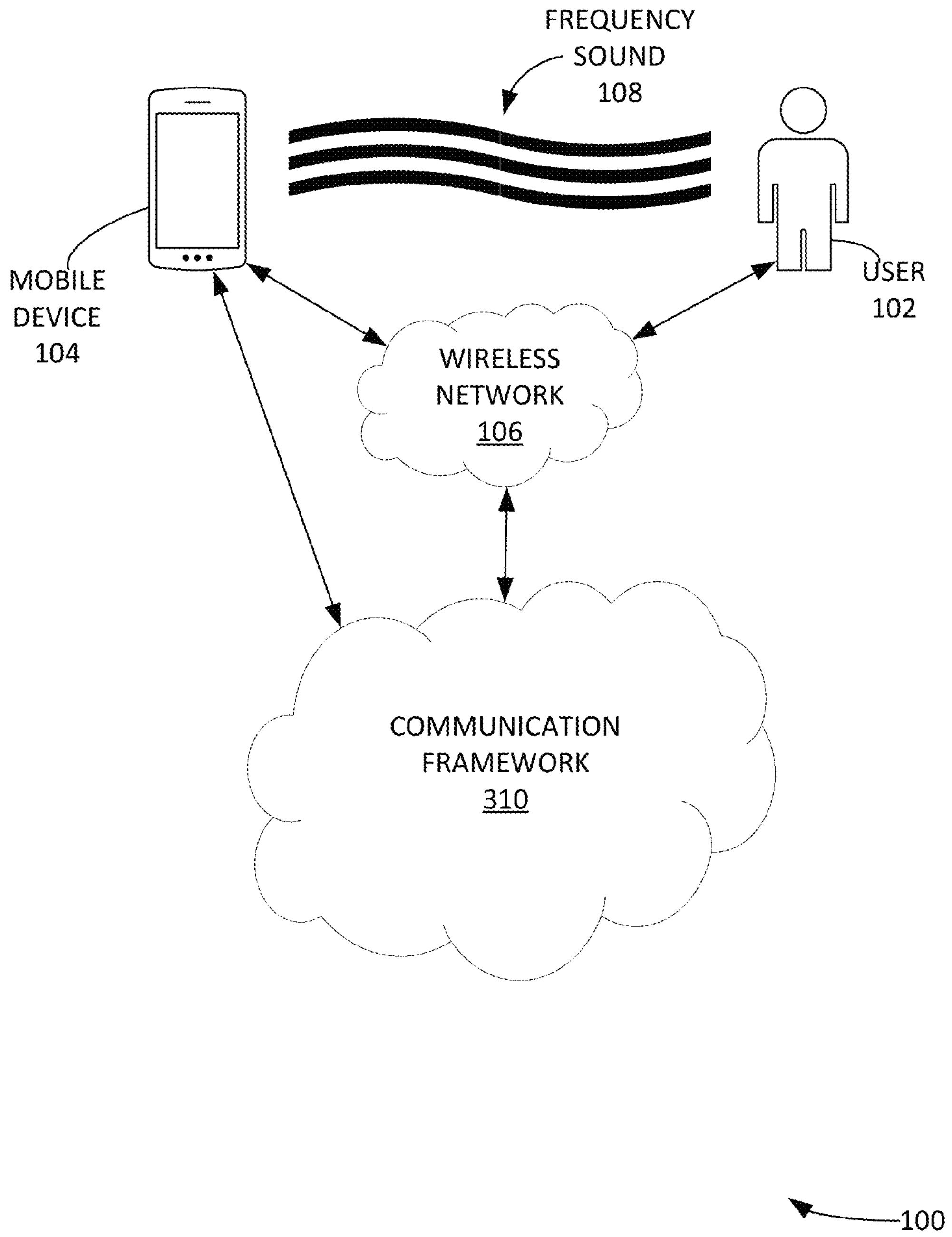
FIG. 1 illustrates an example system of a tone-practice platform 100, according to some embodiments.

The Figures described above are a representative set, and are not an exhaustive with respect to embodying the invention.

DESCRIPTION

Disclosed are a system, method, and article of manufacture for methods and systems of sound/tone practice platform. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Application programming interface (API) can specify how software components of various systems interact with each other.

Bluetooth® is a wireless technology standard for exchanging data over short distances (using short-wavelength UHF radio waves in the ISM band from 2.4 to 2.485 GHz) from fixed and mobile devices, and building personal area networks (PANs).

Media player is a computer program for playing multimedia files like videos movies and music. Media players display standard media control icons known from physical devices such as tape recorders and CD players.

Mobile device 104 can include a handheld computing device that includes an operating system (OS), and can run various types of application software, known as apps. Example handheld devices can also be equipped with various context sensors (e.g. biosensors, physical environmental sensors, etc.), digital cameras, Wi-Fi, Bluetooth, and/or GPS capabilities. Mobile devices can allow connections to the Internet and/or other Bluetooth-capable devices, such as an automobile, a wearable computing system and/or a microphone headset. Exemplary mobile devices can include smart phones, tablet computers, optical head-mounted display (OHMD) (e.g. Google Glass®), virtual reality head-mounted display, smart watches, other wearable computing systems, etc. It is noted that in some examples, custom and/or embedded portable devices can be made for the specific purpose of administrating sonic practices (e.g. no OS but with software to administer the tones. In other examples, a mobile-device application can implement sonic practices without the use of a media player but rather uses the device sound subsystem directly to deliver the sound.

Posturography is the technique used to quantify postural control in upright stance in either static or dynamic conditions. Among them, computerized dynamic posturography (CDP) is a non-invasive specialized clinical assessment technique used to quantify the central nervous system adaptive mechanisms (e.g. sensory, motor, and central) involved in the control of posture and balance, both in normal (e.g. in physical education and sports training) and abnormal conditions.

Wearable technology can be various smart electronic devices (e.g. an electronic device with microcontrollers) that can be worn on the body as implant or accessories. The designs often incorporate practical functions and features. Wearable devices such as activity trackers are a good example of the Internet of Things, since "things" such as electronics, software, sensors, and connectivity are effectors that enable objects to exchange data through internet with a manufacturer, operator and/or other connected devices, without requiring human intervention. Wearable systems can include systems to determine user motion (e.g. hand motion, body balance, head motion, etc.). Wearable systems can be used for computerized dynamic posturography measurements, gait measurements, etc.

Example Computer Architecture and Systems

Sounds can be used to improve various physiological attributes of users. Sound is known to affect the human brain; hence sound or music practice is sometimes used to improve a subject's physical and mental health. Sounds/tones can be brain area specific tones. A brain area can be a neurological region of the human brain associated with the sounds/tone attributes. Mobile devices can include media player applications. These media player applications can be used to deliver therapeutic sounds/tones to users. Sounds of various keys, frequencies, volumes, tones (e.g. a sound characterized by its duration, pitch, intensity, and timbre), etc. can be used to stimulate various regions of the brain. In addition to therapeutic applications, these sounds can also be correlated with improving performance of users in specified activities as well. For example, certain tones played to a user for a specified period of time can improve certain athletic/therapeutic activities (e.g. balance, hand-eye coordination, response times, etc.).

A mobile device application can be provided to leverage the therapeutic applications of using sounds/tones to stimulate specific brain areas. The mobile device application can play specified sounds/tones to users (e.g. via a media player application). The sounds/tones can be played for a specified period of time (e.g. three minutes, during duration of a user activity, etc.). The sounds/tones can be played alone or be integrated into musical songs. The mobile device application can measure a user's physiological responses to the sound/tone. The sound/tone can be adjusted based on the user's physiological responses. Different users can react differently to different sounds/tones. The mobile device application can modify the sound/tone attributes to a user based on multiple trials of multiple sounds/tones. The sounds/tones with the best physiological responses can be selected and used. The mobile device application can periodically review the efficacy of a sound/tone currently used and update the sound/tone if needed. In one example, specified sounds/tones can be used for vestibular stimulation.

FIG. 1 illustrates an example system 100 of a tone-practice platform 100, according to some embodiments. Tone-practice platform 100 can include user(s) 102. User(s) 102 can wear various wearable technology sensors (e.g. smart watches, posturography measurement systems, gait measurement systems, accelerometers, gyroscopes, video cameras, hand-tremor sensors, etc.). Wearable technology sensors can provide various user physiological data to a tone-practice application in mobile device(s) 104 (e.g. via wireless network(s) 106). Wireless networks 106 can a wireless technology standard for exchanging data over short distances (using short-wavelength UHF radio waves in the ISM band from 2.4 to 2.485 GHz) from fixed and mobile devices, and building personal area networks (PANs). Bluetooth® protocols can be used to communicatively couple wearable technology sensors with mobile device 104. Mobile device 104 can also include various sensors that can be used to obtain user movement and/or other physiological data. Mobile device 104 can include, inter alia: speakers, head-phone jacks and/or a media player application.

Tone-practice application can provide tone practice (e.g. sonic practice, sound practice, embedded-frequency music practice, etc.). Tone-practice application in mobile device(s) 104 can play sound tone to user (e.g. via headphones, etc.). Tone-practice application can play the tone at a specified frequency for a certain period of time. Tone-practice application can embed tones in digitized music that is played to the user via a media player application. Tone-practice application can include a dashboard whereby the user can input a practice type and/or a pathology type. The practice type and/or pathology type can be associated with a region of the user's brain and/or a set of tone frequencies. Each region/area (e.g. hemisphere) of the user's brain can be associated with a set of tone frequencies. A tone can be selected from the set of tone frequencies and played to the user. In some examples, feedback can be obtained from the user (e.g. explicit feedback, implicit feedback, bioresponse feedback, etc.). Based on this feedback, the selected tone can be repeatedly used and/or modified. In this way, a most effective tone can be determined. In some examples, other tone attributes (e.g. volume, play duration, etc.) can also be determined and/or updated using iterative feedback. Tone can be provided to user using frequency sound 108.

It is noted that sound propagates as mechanical vibration waves of pressure and displacement, in air or other substances. Frequency is the property of sound that most determines pitch. An audio frequency (or audible frequency) is characterized as a periodic vibration whose frequency is audible to the average human. The SI unit of audio frequency is the hertz (Hz). The generally accepted standard range of audible frequencies is 20 to 20,000 Hz, although the range of frequencies individuals hear is greatly influenced by environmental factors. Frequencies below 20 Hz are generally felt rather than heard, assuming the amplitude of the vibration is great enough. Frequencies above 20,000 Hz can sometimes be sensed by young people. High frequencies are the first to be affected by hearing loss due to age and/or prolonged exposure to very loud noises. The frequencies an ear can hear are limited to a specific range of frequencies. The audible frequency range for humans is typically given as being between about 20 Hz and 20,000 Hz (20 kHz), though the high frequency limit usually reduces with age. Other species have different hearing ranges. For example, some dog breeds can perceive vibrations up to 60,000 Hz.

Example systems that can be used in tone-practice platform 100 can include Samsung® Pre-programmed 7" Galaxy Tab or 4" Pre-programmed Touch-Screen Mp3 Player (to delivers audio and/or video content), and a set of BOSE® ae2 dynamic frequency/over-the-ear studio grade headphones to administer patient practice or Sport Ear Bud Headphones. These can be used to deliver out-of-clinic patient sonic practice. A user can subscribe and receive the sonic practice program that is most effective for their recovery. Once set up, tone-practice platform 100 can deliver program content directly to the user's (e.g. a patient, an athlete, a student, etc.) mobile device. The user can then use a tone-practice application to access their sonic practice program. Sonic practice can be used in-between clinic visits and be a component of practice used to maintaining a patient's baseline in advance of their next in-clinic practice.

Sonic practice can include a practice method that utilizes acoustical frequencies to treat neurological and musculoskeletal disorders by improving normal function to various areas of the brain and central nervous system. The application of specific tonal frequencies results in the firing of central neurological centers of the brain. Sonic therapeutic tones are administered using an Apple® or Android®-based mobile phone, tablet or player paired with high quality low end resonate frequency headphones. The use of Sonic Practice results in a stabilization of these neurological centers and the improvement of normal function. Different acoustic tones stimulate the vestibular system and descending motor pathways in specific ways thus allowing for precise reproducible clinical outcomes. In some embodiments, a range of vibrational frequencies delivered through the inner ear activate specific areas of the brain, neural pathways in the body and can even stimulate the growth of new neural connections. This can provide the following benefits including, inter alia: improving balance; synchronizing the two or more areas (e.g. hemispheres, etc.) of the user's brain; activating extensor muscles; increasing physical strength; improving recovery from injury; improving coordination of fine-motor control; lowering a user's heart rate; reducing nausea; activating and rejuvenating the body's energy system; etc. Athletes can benefit from improved balance for physical performance while supporting training regimens that aid in recovery from injury. Sonic practice can improve the balance of accident victims in rehabilitation. For inactive seniors, sonic practice can activate the brain and neurological system.

Figure 2:
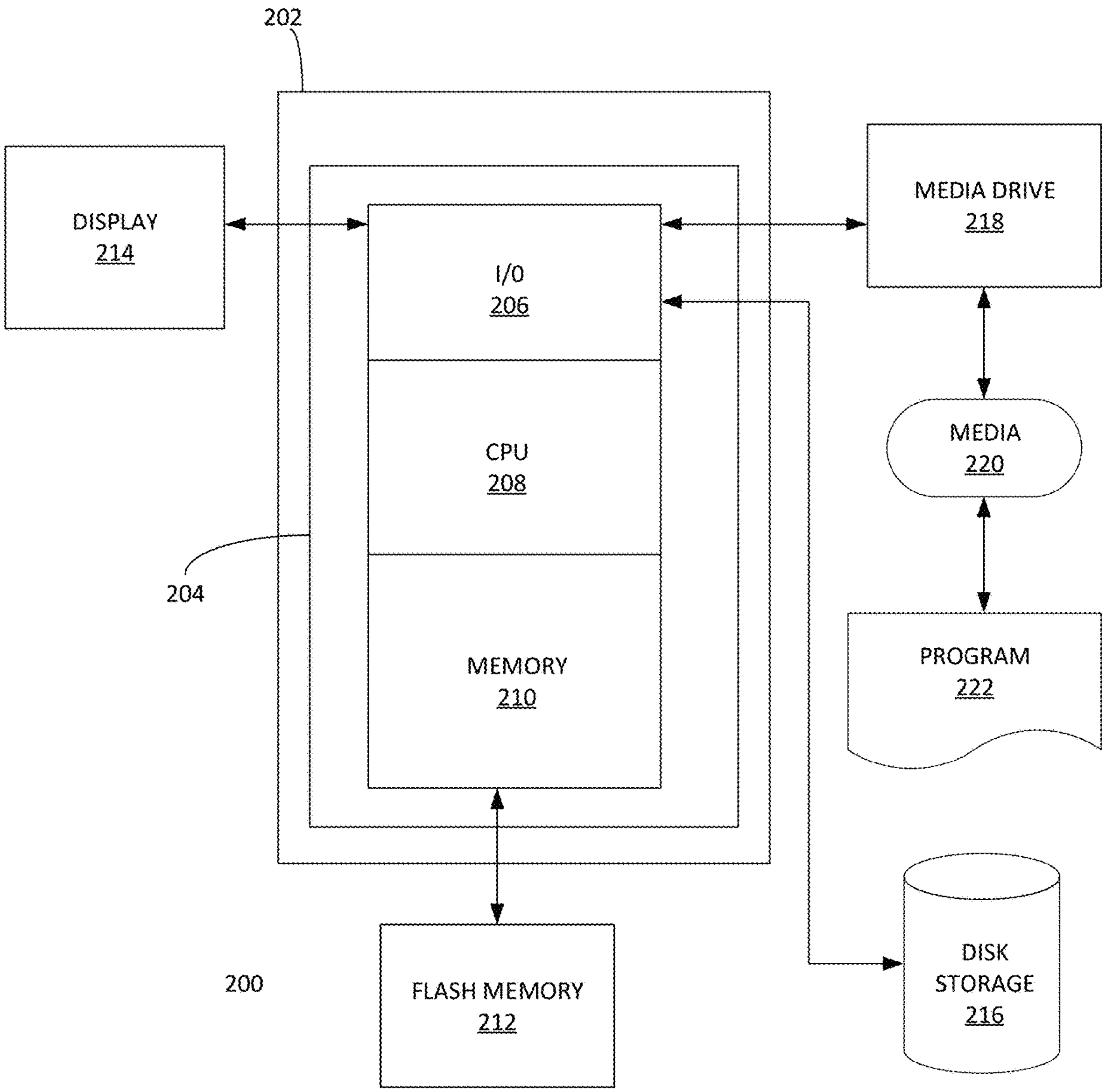
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
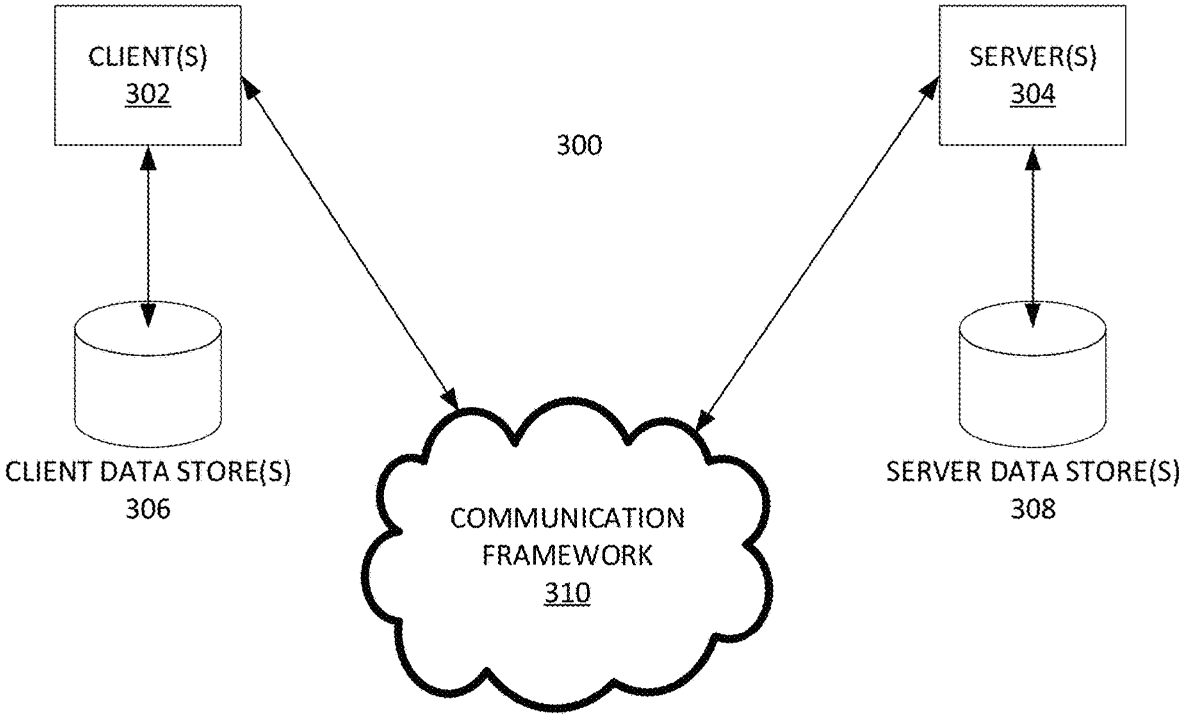
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

FIG. 4 illustrates an example table 400 of tones that can be used to implement tone practice (e.g. sound practice, etc.), according to some embodiments. The sound-practice protocol use sinusoidal tones (e.g. tones provided in table 400, etc.). In one example, the tones can include various key notes for the fourth octave version of the seven major musical keys. The second harmonic was over thirty-six (36) decibels (dB) lower in average power than the fundamental frequency. The third harmonic can thirty (30) dB below the second harmonic. Steps can be taken to provide a high tonal purity such that the user is aware of the fundamental frequency. In some examples, tones can be embedded into a digital audio files. The musical piece in the digital audio files can be analyzed to ensure that it can be played in each of the major musical keys. For each tone in table 400, the music piece can be adjusted to be in the same key as the embedded tone so as to be pleasant to the user. Feedback can be received from the user. Accordingly, the amplitude of the tones to be added can be decreased relative to the amplitude of the music piece as the frequency increased to maintain the same perceived relative volume level. The sound practice can be provided to the user via various stereo types (e.g. headphones, speakers, etc.). FIG. 5 illustrates another example set of table 500 of tone information that can be used to implement tone practice, according to some embodiments. It is noted that methods can be extended all octaves of sound in various embodiments as well and the present embodiments are provided by way of example and not of limitation.

Figure 6:
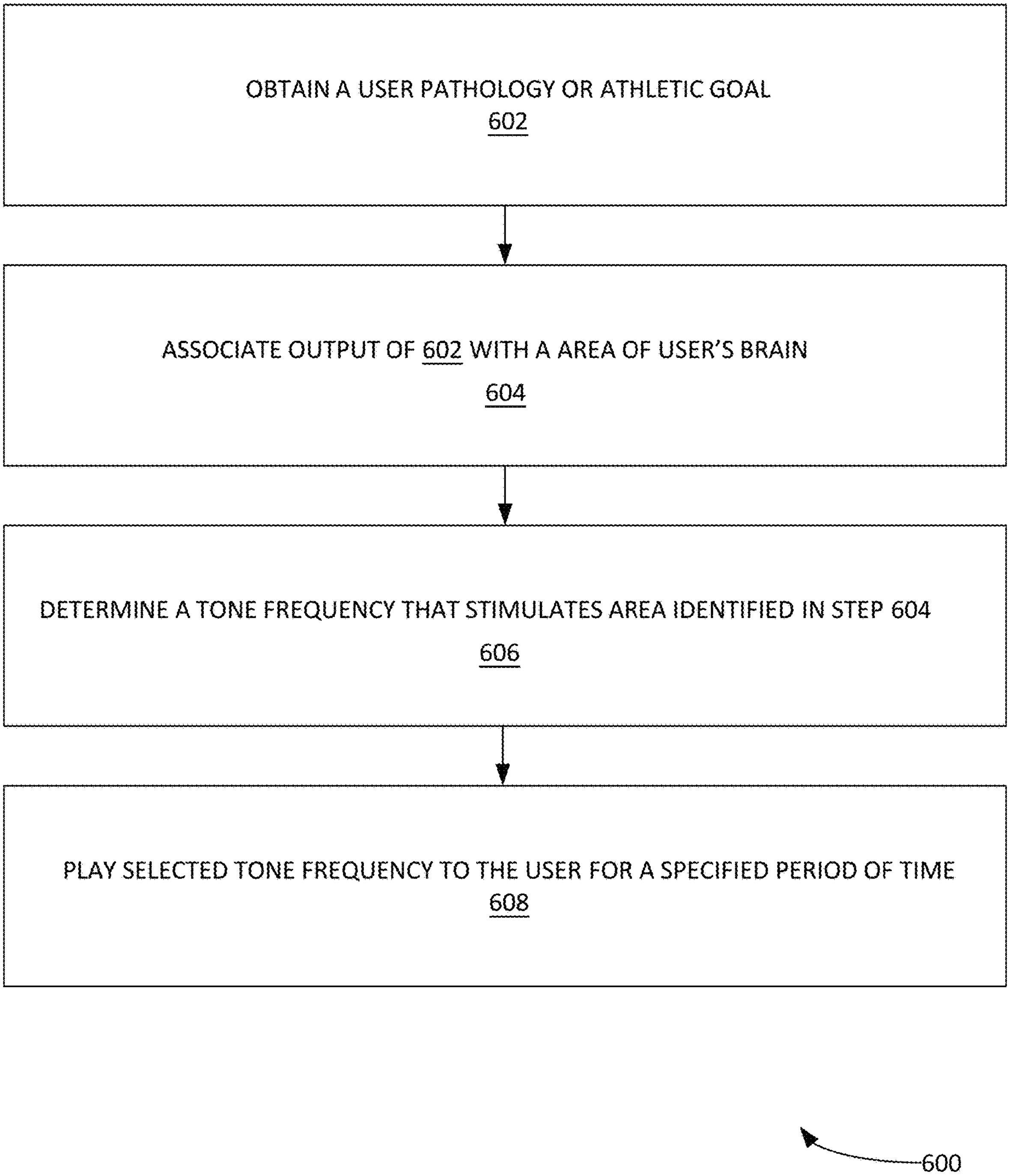
FIG. 6 illustrates an example process for auditory therapeutic stimulation with a mobile-device application, according to some embodiments.

FIG. 6 illustrates an example process 600 for auditory therapeutic stimulation with a mobile-device application, according to some embodiments. In step 602, process 600 can obtain a user pathology or athletic goal. In step 604, process 600 can associate output of 602 with an area of user's brain. In step 606, process 600 can determine a tone frequency that stimulates an area identified in step 604. In step 608, process 600 can play selected tone frequency to the user for a specified period of time.

Figure 7:
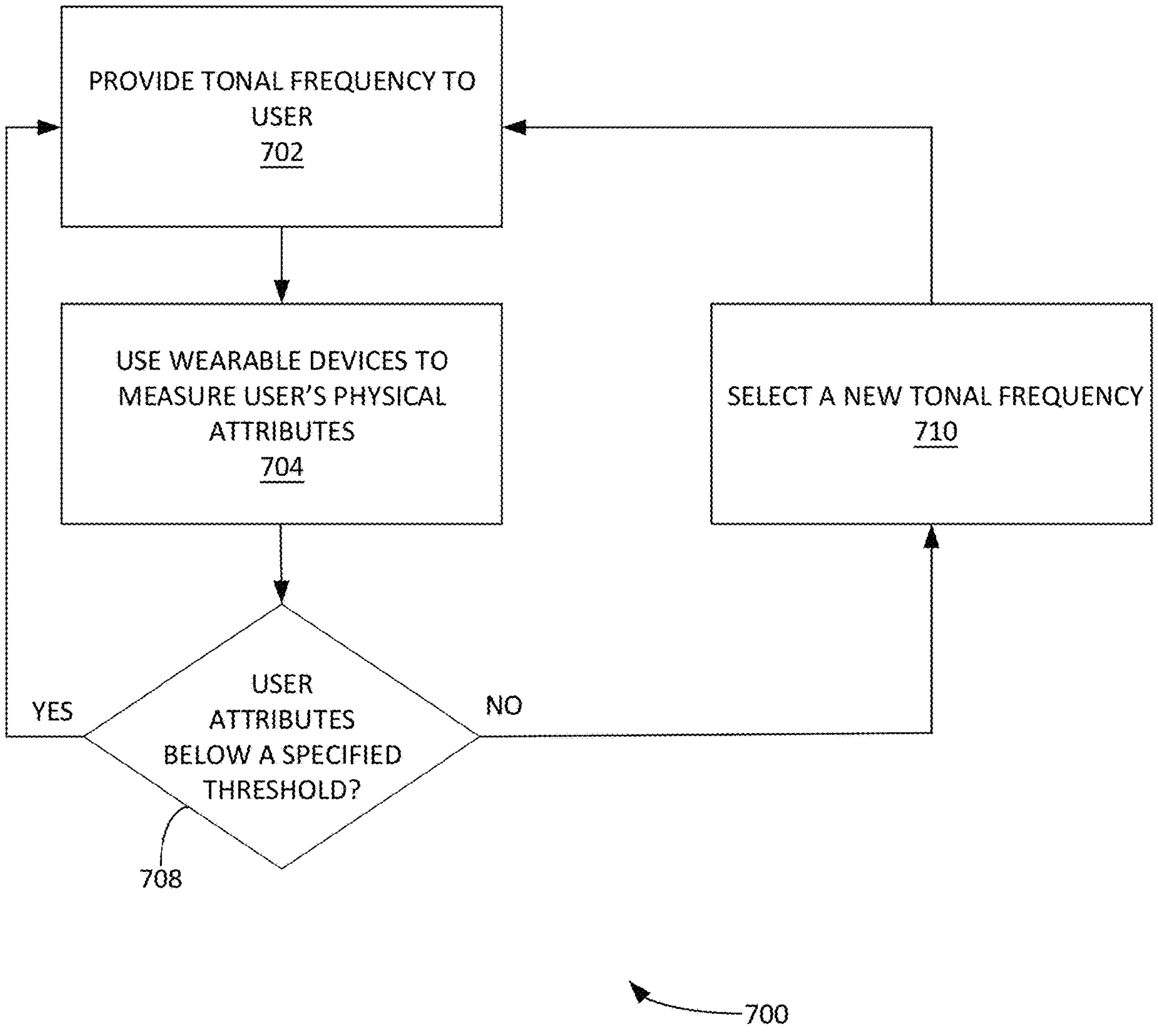
FIG. 7 illustrates another example process for auditory therapeutic stimulation with a mobile-device application, according to some embodiments.

FIG. 7 illustrates another example process 700 for auditory therapeutic stimulation with a mobile-device application, according to some embodiments. In step 702, process 700 can provide tonal frequency to user. For example, process 600 can be implemented. Tonal frequencies can be periodically played to a user as a series of sonic practice sessions. Tones can be selected based on the information in tables 500 and 600.

In step 704, process 700 can use wearable devices to measure user's physical attributes. For example, a user's hand tremors can be measured. A user's balance ability can be measured. A user's gait can be measured. It can be determined if a user physical attribute(s) measured in step 708 is below (or above) a specified threshold? For example, it can be determined that the current tonal frequency has little to no effect on the user's physical attribute. If 'no,' then, process 700 can return to step 702 and the sonic practice can continue. If 'yes,' then process 700 can select a new tonal frequency in step 710. In one example, process 700 can be implemented at six-week intervals.

Additional aspects that can be utilized in the systems and processes provided herein are now discussed. Various safeguards can be included in a sonic practice application. A safeguard can measure user physiological responses to sonic practice and turn it off when it detects a deleterious effect. A sonic practice application can utilize various time durations. For example, the sonic practice application can maintain a tone variance of about two to three minutes. The tone can then be turned off after this time period. It can then restart after another interval (e.g. ten (10) minutes) and then restart for three (3) minutes. Sonic practice can be implemented during a workout and/or when doing other activities. In one example, it can be implemented multiple times a day (e.g. twice daily, etc.).

An example set of tonal associations is now provided. A tone in the note of C can be used to reduce various cardiac pathologies. A tonal/sonic practice application can play tones to find tone that is best suited for user. tonal/sonic practice application can analyze music and select most efficient tone (e.g. one that correlates best with tones listening to). The tonal/sonic practice application can recommend music/ can select music based on this analysis.

In one example embodiments, tones in the notes of C, D, and E can be used to stimulate the right hemisphere of the brain. The tone of in the note of F can be neutral and can be used as a control tone. Tones in the notes of G, A, and B can be used to stimulate the left hemisphere of the brain. Higher tones can be used to stimulate the left hemisphere of the brain. Lower tones can be used to stimulate the right hemisphere of the brain.

Various test/questions can be pushed to the user via a sonic practice application. These can be used to obtain various user information and perform a neurological evaluation.

It is noted that the systems and process provided herein can be adapted for sound/tonal/sonic practice in animals. For example, veterinarians can be use tonal practice to treat certain disorders in pets/livestock.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations).

Accordingly, the specification and drawings are to be regarded in an illustrative rather than a restrictive sense. In some embodiments, the machine-readable medium can be a non-transitory form of machine-readable medium.

What is claimed by United States patent:

1. A computerized method of auditory therapeutic stimulation with a mobile-device application for comprising:

with a mobile device:

provide an auditory therapeutic stimulation application operative in the mobile device;

receive a user input comprising a user pathology of the user or an athletic goal of the user;

associate the user input with a neurological region of user's brain by:

provide a table of tones, for each tone in the table of tones, play a music piece that is adjusted to be in a same key as an embedded tone in the table of tones so as to be pleasant to the user, and receive a feedback from the user;

determine a tone frequency that stimulates the neurological region of user's brain;

determine a specified period to play the tone frequency; and play the tone frequency to the user for the specified period of time.

2. The computerized method of claim 1, wherein the user pathology of the user or an athletic goal comprises a Postural Orthostatic Tachycardia Syndrome.

3. The computerized method of claim 2, wherein the neurological region of user's brain comprises a right frontal region, a right parietal region, a right mesencephalon region, and a left cerebellum neurologic region.

4. The computerized method of claim 3, wherein the time period comprises at least a ten-minute period.

5. The computerized method of claim 1, wherein the tone frequency is 261.63.

6. The computerized method of claim 1, wherein the tone frequency is 293.66.

7. The computerized method of claim 1, wherein the tone frequency is 329.63.

8. The computerized method of claim 1, wherein the tone frequency is 349.23.

9. The computerized method of claim 1, wherein the tone frequency is 392.00.

10. The computerized method of claim 1, wherein the tone frequency is 440.00.

11. The computerized method of claim 1, wherein the tone frequency is 493.88.

12. The computerized method of claim 1, wherein the athletic goal of the user comprises an improving balance goal, a synchronizing brain hemispheres goal, an activating extensor muscle's goal, an increasing physical strength goal, an improving recovery from injury goal, an improving coordination of fine-motor control goal, a lowering a user's heart rate goal, a reducing nausea in the user goal, or a vestibular stimulation goal.

13. The computerized method of claim 1, wherein the tone frequency comprises a set of specified key notes for a fourth octave version of seven major musical keys.

14. The computerized method of claim 13, wherein the tone frequency comprises a second harmonic over thirty-six (36) decibels (dB) lower in an average power than a specified fundamental frequency.

15. The computerized method of claim 13, wherein the tone frequency comprises a third harmonic that is thirty (30) dB below a second harmonic.

16. The computerized method of claim 1, wherein plurality of tone frequencies are embedded into a plurality of digital audio files such that a musical piece in the plurality of digital audio files is played in each of a set of major musical keys.

17. The computerized method of claim 16, wherein the music piece is modified to be in a same key as the embedded tone so as to be pleasant to the user.

18. The computerized method of claim 16, wherein an amplitude of the tone frequencies are decreased relative to an amplitude of the music piece as the tone frequency is increased to maintain a same perceived relative volume level.

19. The computerized method of claim 18, wherein the user wears a biosensor and a bioresponse feedback data from the biosensor is used to modify an attribute of the tone frequency.

20. The computerized method of claim 19, wherein a plurality of tone attributes are updated using an iterative feedback from the user, and wherein the plurality of tone attributes comprises a tone volume and a tone play duration.

* * * * *